United States Patent [19]
Pentith

[11] Patent Number: 4,577,749
[45] Date of Patent: Mar. 25, 1986

[54] FRICTIONAL DRIVE MEANS AND METHOD FOR DRIVING FRICTIONAL ROLLERS

[75] Inventor: Gerald R. O. Pentith, Sturgis, Ky.

[73] Assignee: Continental Conveyor & Equipment Co., Inc., Winfield, Ala.

[21] Appl. No.: 625,059

[22] Filed: Jun. 27, 1984

[30] Foreign Application Priority Data

Jul. 1, 1983 [GB] United Kingdom ............... 8317922

[51] Int. Cl.⁴ .................................... B65G 39/08
[52] U.S. Cl. .................................. 198/805; 474/142
[58] Field of Search ............... 198/805, 835; 474/142; 226/93, 94

[56] References Cited

U.S. PATENT DOCUMENTS

| | | | |
|---|---|---|---|
| 486,393 | 11/1892 | De Bovet | 474/142 |
| 816,806 | 4/1906 | Magnuson | 474/142 X |
| 996,022 | 6/1911 | Lindhard | 474/142 |
| 996,933 | 7/1911 | Lindquist | 474/142 X |
| 1,043,527 | 11/1912 | Lindquist | 474/142 |

FOREIGN PATENT DOCUMENTS 143358  8/1903  Fed. Rep. of Germany ...... 474/142

Primary Examiner—Joseph E. Valenza
Assistant Examiner—Michael Stone
Attorney, Agent, or Firm—Woodrow W. Ban

[57] ABSTRACT

An improved friction roller including arcuate sections applied to an external surface thereof, the sections configured to receive and engage a magnetic flexible element such as a cable, and including a magnetic field generating coil means for attracting the cable to the arcuate section and thereby to the frictional roller.

12 Claims, 4 Drawing Figures

FRICTIONAL DRIVE MEANS AND METHOD FOR DRIVING FRICTIONAL ROLLERS

FIELD OF THE INVENTION

This invention relates to drive mechanisms in which a flexible element passes over the surface of a friction roller whereby the direction of travel of the flexible element is altered. More specifically, this invention relates to such drive systems wherein the flexible element is magnetic. Particularly, this invention relates to conveyor systems wherein a magnetic flexible belt or cable system engages frictional rollers in a driving/driven relationship.

BACKGROUND OF THE INVENTION

Conveyor systems wherein a frictional roller engages a flexible element in driving/driven relationship are well known. Typically, the flexible element is in the form of a belt or rope. Most frequently, the frictional roller will be formed from a metallic substance or an elastomeric substance having elevated abrasion resistance properties.

Often such conveyor systems find application in apparatus wherein the frictional roller is driven and imparts motion to the flexible element as the flexible element frictionally engages the roller. For example, in a long conveyor system, one or more ropes or cables may pass around a driven drum and support a conveying belt. In a lifting apparatus, typically the object being lifted is carried by a rope passing over a number of pulleys and engaging a driven drum or winch. In such applications, the ropes generally are formed from a metallic substance such as steel and are more frequently termed as cables. Typically, such cables or ropes are possessed of significant magnetic properties.

In such conveying systems, the frictional roller and the cable or rope establish a driving interrelationship resulting from frictional engagement between the frictional roller and the rope. Such frictional engagement typically causes wear both to the rope and to the frictional roller. The frictional wear typically necessitates more frequent replacement of the ropes and/or the frictional roller resulting in an elevated maintenance expense. Where the tension under which a rope or a cable in such a system is maintained, is increased in order to reduce slippage at the point of frictional engagement between the rope and the frictional roller, generally the rope or cable suffers a reduced service life.

A conveying device wherein an enhanced driving contact can be maintained between the flexible element and the frictional roller while relieving the necessity for maintaining the flexible element under a substantially elevated tension, could find wide utility in the manufacture of conveying systems.

DISCLOSURE OF THE INVENTION

The present invention provides a method for enhancing engagement between a frictional roller and a flexible element engaging the roller. Flexible elements suitable for use in practicing the method of the instant invention should be magnetic in nature. Typically the engagement between a frictional roller and a flexible magnetic element in the practice of the instant invention results in a change in the direction of travel of the flexible magnetic element.

In practicing the method of the instant invention, a plurality of arcuate sections are applied to an external surface of the frictional roller. The arcuate sections include at least one electromagnetic field-generating coil. Since in typical applications, the flexible magnetic element does not engage the entire circumference of the frictional roller, a sensing element may be provided for sensing those arcuate sections engaged by the flexible magnetic element. For those arcuate sections engaging the frictional magnetic element, a source of electrical current is employed to energize the electromagnetic field generating coil to produce a magnetic field configured to attract the flexible magnetic element on to the roller.

In preferred methods of practicing the instant invention, the flexible magnetic element is a rope or cable made from a magnetic substance such as steel, and the arcuate sections include a channel configured to receive the rope or cable. The electromagnetic field generating coil is embeddedly positioned within the arcuate section and is possessed of a longitudinal axis configured to parallel a longitudinal axis of the channel or groove. The channels of the arcuate sections are aligned to facilitate a smooth transfer of the rope or cable from arcuate section to adjacent arcuate section.

In much preferred embodiments of the invention, the electromagnetic field generating coil is energized by first providing a low voltage electrical current and a pulse generating circuit. A silicon control rectifier (SCR) controlled electrical interconnection between the coils and a source of line electrical voltage is provided to be triggered by the pulse generating circuit, and a resistance-capacitance circuit is provided bridging between the coil and one leg of the line voltage. A flow of the low voltage electrical current, when supplied to the pulse generating circuit causes the SCRs supply line electrical current to the coils.

In a friction roller that includes an outer friction surface, an inner surface and includes a bearing surface, the present invention provides the improvement comprising a plurality of arcuate sections appliedly positioned upon and surroundingly affixed to the friction roller outer surface. The friction roller includes a means for transferring electrical current to the arcuate sections while adhered to the external surface of the friction roller. Each arcuate section generally includes an electromagnetic field generating coil positioned beneath or embeddedly positioned within the arcuate section, the coil having a longitudinal axis configured so that when the magnetic field generating coil is actuated, the metallic flexible element is drawn against the friction roller. The arcuate sections include a means for sensing the proximity of the metallic flexible element and for transmitting electrical current through the coil when the flexible element is in contact with the particular arcuate section.

In preferred embodiments, the arcuate section includes at least one channel formed in the outer surface of the arcuate section, the channel being configured to receive the flexible metallic element, generally a cable or rope. The longitudinal axis of the magnetic field generating coil is preferably oriented to parallel the channel. The arcuate sections are positioned upon the frictional rollers so that the channels are aligned to provide a smooth transition of the cable or rope from one arcuate section to an adjacent arcuate section.

Typically, the friction roller will be a pulley, drum, winch drum or conveyor drive.

Preferred means for transmitting electrical current through the magnetic field generating coils are generally solid state in nature to provide for extended service life. Typically, a low voltage circuit is employed to trigger the application of line electrical current to the magnetic field generating coils. A preferred embodiment such low voltage systems include a proximity switch for detecting the presence of the flexible magnetic element in close proximity to the arcuate section, and solid state rectifiers such as silicone control rectifiers (SCR) for switching electrical current to the magnetic field generating coils.

The above and other features and advantages of the invention will be become more apparent when considered in light of the specification and drawings that follow, together forming a part of the specification.

BEST EMBODIMENT OF THE INVENTION

The present invention provides an improved frictional roller assembly for retaining flexible elements driving or being driven by the frictional roller where such flexible elements are significantly susceptible to the influence of a magnetic field. As used herein, the term frictional roller means any generally cylindrical device for frictionally engaging a flexible element such as a belt, cable, or rope whereby the direction of travel of the flexible element is altered as a result of frictional interaction between flexible element and the frictional roller. Typically, a frictional roller contemplated for use in the practice of the instant invention would include a pulley; a drum such as a winch drum, a cable drum, a conveyor drum, or a support drum; idlers; directional rollers; and an accumulator.

By flexible element as used herein what is meant is a flexible belt, cable or rope having magnetic properties or susceptability to being attracted by magnetic fields and employed for driving a frictional roller or being driven by a frictional roller. Typically such flexible elements are employed for driving rollers, drums and the like or for carrying belts and other flexible structures in a supporting relationship. Typically, such flexible elements are made of steel or other metallic substances but these flexible elements can also be formed from an elastomeric property having a filler susceptible to a attraction by a magnetic field. For example, such flexible elements can be formed from so-called rubbers and other elastomers filled with an iron containing particulate. There is also no requirement that a cable, rope or belt forming a flexible element be composed entirely of a magnetic substance. Typically, for example, wire cables may comprise a plurality of wire fibers wound surrounding a fabric center cord. Suitable or conventional flexible elements for use in the practice of the instant invention are well known in the art of fabric belt, rope and cable manufacture.

The frictonal rollers employed in the practice of the instant invention can be: (a) idlers, that is, unpowered rollers performing no work as a result of the flexible element having passed over the roller; (b) powered rollers, that is, rollers which drivingly engage the flexible elements; and (c) driven frictional rollers, rollers that are driven by the flexible element passing over the roller, the driven flexible roller generally including means for utilizing energy transmitted from the flexible element to the driven roller. The use of any of driven, driving or idler rollers is contemplated as being within the perview of the instant invention. Preferably, however, the instant invention is employed with driven or driving rollers.

Figure 1:
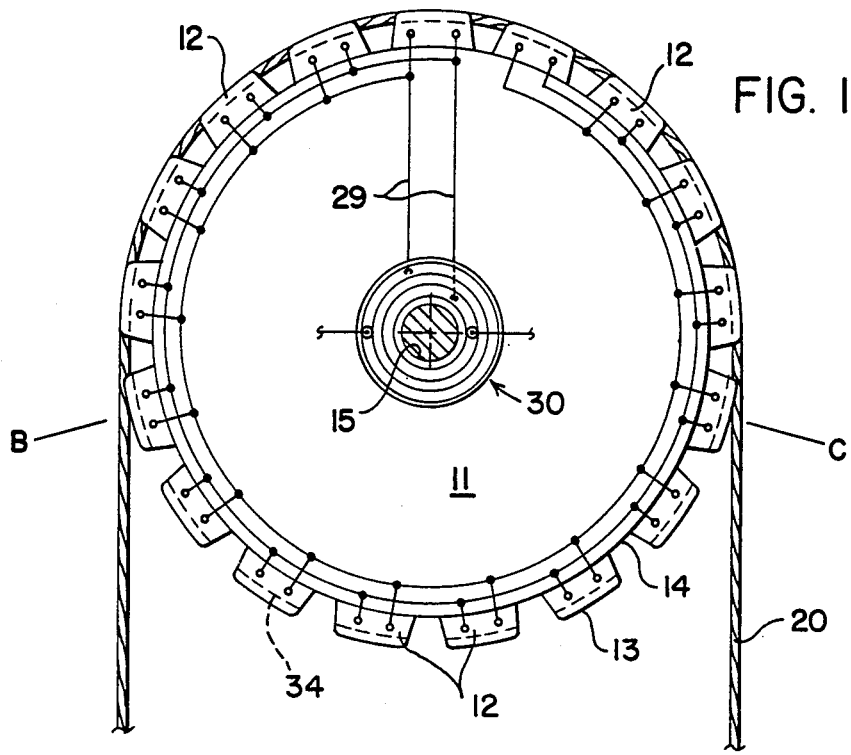
FIG. 1 is an end view of a frictional roller embodying the invention.

Referring to the drawings, FIG. 1 depicts a plan or top view of a typical roller in accordance with the instant invention. The roller is designated generally at 11, and includes arcual elements 12 positioned surrounding the roller 11. The arcual elements 12 include an outer surface 13 obversly positioned with respect to an external surface 14 of the roller 11. The roller also includes an inner surface designated generally at 15 and at least a portion of this inner surface may function as a bearing surface for supporting the roller. Alternately, a separate bearing surface (not shown) may be provided.

Figure 2:
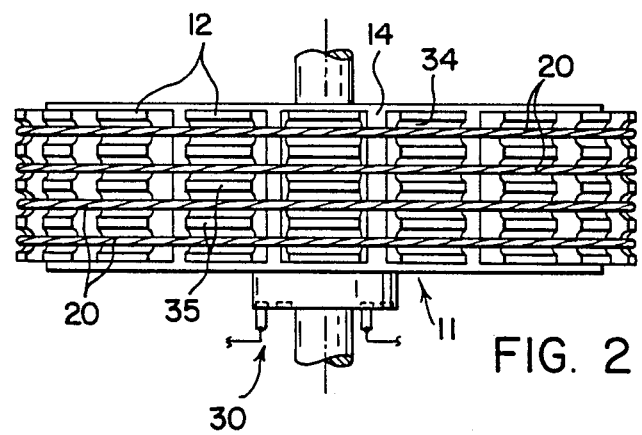
FIG. 2 is an edge view of a frictional roller embodying the invention.

A source of electrical current 29 is joined to the arcual sections 12. Referring to FIG. 2, the electrical current 29 can be supplied in any suitable or conventional manner, but typically is supplied to the frictional roller 11 employing a well-known slipring and brush assembly designated generally at 30. It should be noted however, that any suitable or conventional means for transmitting electrical current from a source to the rotating frictional roller 11 can be employed in the practice of this invention. The electrical current supplied to the frictional roller can be either alternating or direct current and may be of any suitable voltage.

A rope, or cable 20 passes around the frictional roller 11 engaging the frictional roller generally from a point designated as C until a point designated at B. The cable 20 is typically formed from a magnetic material such as steel. It should be apparent that the cable 20 need be attracted to the frictional drum 11 only along the arc between the reference letters C and B.

Figure 3:
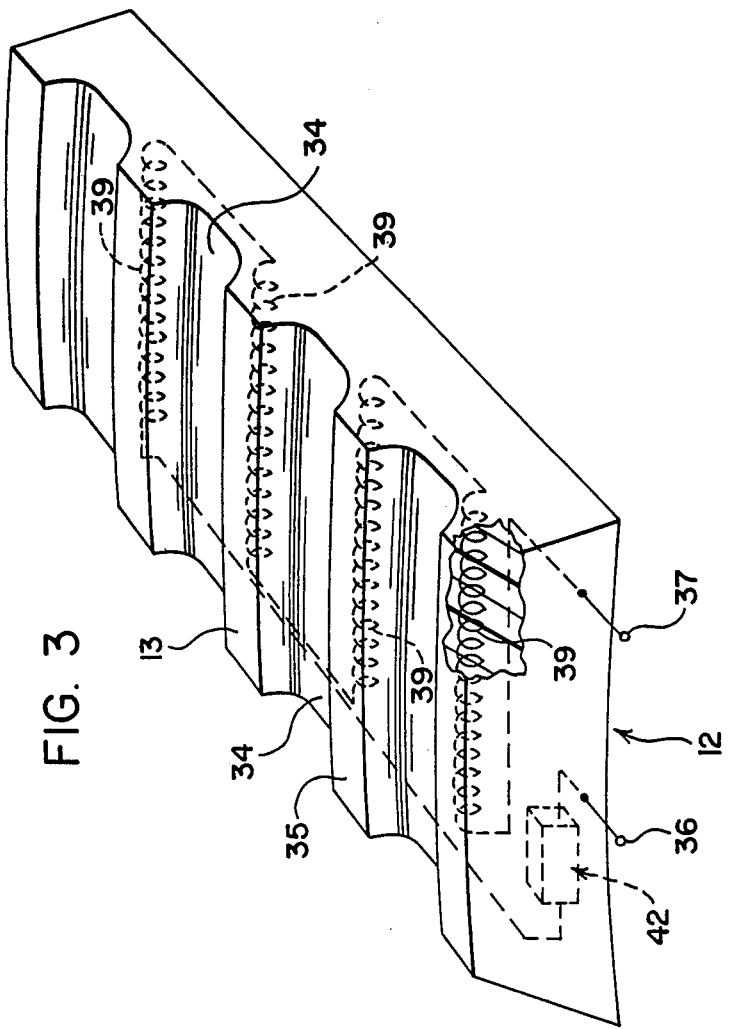
FIG. 3 is a perspective view of an arcuate section in accordance with the instant invention.

Referring to FIG. 3, it may be seen that each arcuate section 12 includes a plurality of channels 34 separated by ridges 35. The channels 34 are configured to accept the wire cable 20 in a snug fitting relationship. The channels 34 and the ridges 35 function as shown in FIG. 2 to assure a smooth transition of the cable 20 from one arcuate section to an adjacent section as the cable passes around the frictional roller 20. Referring again to FIG. 3 the electrical supply joins the arcuate section at terminals 36, 37.

The arcuate section 12 includes a plurality of magnetic field generating coils 39 interconnected in series with the electrical terminal 37. These field generating coils are preferably embeddedly positioned within the arcuate section and are possessed of a longitudinal axis (not shown) generally parallel with a longitudinal axis (not shown) of a corresponding channel 34. It is preferable that the coils 39 be generally centrally positioned beneath the channels 34. But where, for example, the arcuate section includes merely a single flat channel for receiving a wide belt, other positioning arrangements for the coils may be desirable. The coils are joined through an electrical control system shown generally at 42 with the remaining electrical terminal 36.

Figure 4:
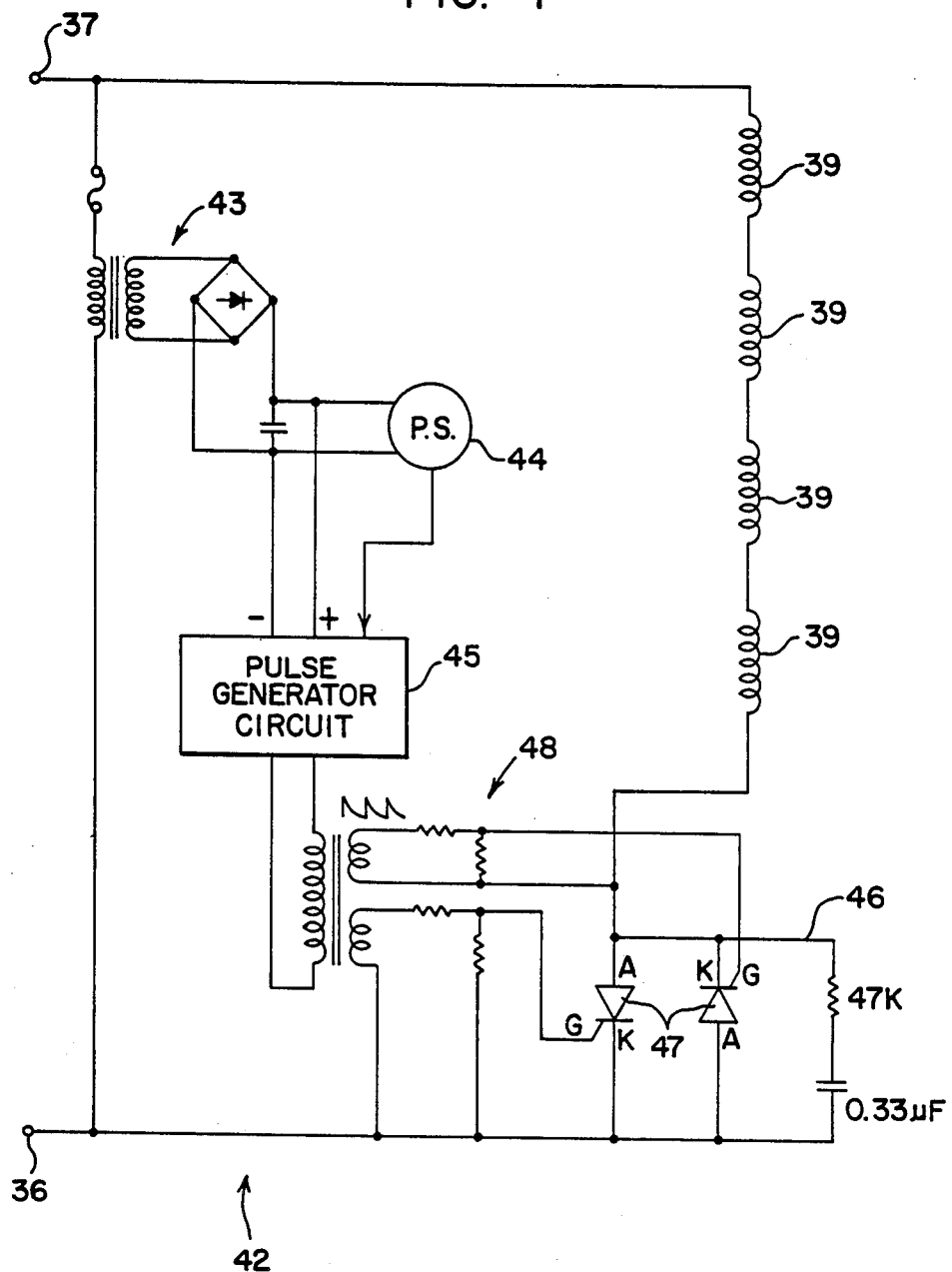
FIG. 4 is a schematic of an electrical supply circuit for energizing the magnetic field generating coils.

Referring to FIG. 4, the electrical control scheme is shown in schematic form and includes a suitable or conventional transformer 43, a proximity switch 44, a pulse generating circuit 45, a resistance-capacitance innerconnection 46, and a pair of silicone control recitifiers (SCR) 47, also frequently known as thyristors, together with electrical innerconnections shown generally at 48 of suitable or conventional well known nature for joining the SCR's with the pulse generator circuit. The electrical schematic as shown in FIG. 4 employs a low voltage current interruptable by the proximity switch 44 for activating the pulse generator circuit 45. The pulse generator circuit 45 produces an induced current flow in the SCR triggering circuit 48 which functions to open the gate of the SCRs 47 and permit electrical current flow through the magnetic coils 39. The resistance-capacitance circuit 46 serves to protect the SCRs from possible elevated voltage conditions as the magnetic field collapses about the magnetic coils when electrical current flow is discontinued therethrough.

The proximity switch can be of any suitable or conventional type configured for sensing the presence of the cable 20 so as to initiate electrical current flow through the pulse generator circuit and thereby employing the SCRs 47 to initiate flow of electricity through the magnetic coils. It should be apparent, that where the proximity switch 44 is capable of handling an elevated voltage such as line current, the necessity for a reduced voltage control system is eliminated and the magnetic coils 39 may be connected in series with a proximity switch 44 between legs of the electrical power lines. Alternately, the proximity switch operating on low voltage, can be caused to trigger a relay or solonoid which may then directly connect electricity between the legs of the electrical power line through the magnetic coils.

In the practice of the instant invention the desired effect is the initiation of electrical current flow through the magnetic coils of an arcuate section as the cable 20 contacts that arcuate section and thereby the frictional roller 11 and any suitable or conventional means for establishing such a magnetic field is believed acceptable in the practice of the instant invention.

The arcuate sections 12 may be formed of any suitable or conventional material. Where the arcuate sections 12 are formed from a metallic substance capable of conducting electricity, it is important that the coils 39 and associated circuitry be electrically insulated from the arcuate section so as to prevent short circuitry. Likewise, the electrical terminals 36, 37 should be insulatingly supported upon the arcuate section 12.

Alternately, the arcuate section 12 may be formed from an elastomeric or thermosetting plastic material. Such materials are well-known in the art of conveyor design and provide in many cases the additional benefit of being electrically relatively non-conductive. When employing such elastomeric or thermosetting materials, it is often unnecessary to provide insulation between the magnetic field generating coils and the arcuate section 12.

Preferably the electrical controls 42 are sufficiently miniaturized to enable building of the control scheme 42 directly into the arcuate section. It is particularly desirable that mechanical components be avoided in the construction of such a control circuit 42 and that solid state components be used exclusively. Particularly, solid state components offer an advantage in avoiding mechanical wear as in typical applications; the frictional roller 11 can undergo a number of revolutions per minute which would quickly extract a deleterious toll from any mechanical components.

With the magnetic field generating coils energized, as the cable passes around the frictional roller 11 from point C to point B, the cable, susceptible to magnetic field influence, is drawn against the roller enhancing the frictional interaction between the arcuate sections 12 and the roller 11 and the cable 20. As a result, less slippage is engendered between the frictional roller 11 and the cable 20 as the cable passes over the roller without the necessity for tightening the cable to a point where deleterious strain effects are imposed upon the cable.

While a preferred embodiment of the invention has been shown and described in detail, it should be apparent that various modifications and alternations may be made thereto without departing from the scope of the claims that follow.

What is claimed is:

1. In a friction roller having an outer friction surface and an inner surface and including a bearing surface, the improvement comprising:
  (a) a plurality of arcuate sections positioned upon and surroundingly affixed to the friction roller, each arcuate section having at least one channel positioned upon an arcuate section surface obverse to the internal surface of the friction roller;
  (b) the channel being configured to receive a rope having magnetic properties, similar channels on adjacent arcuate sections being aligned for smooth transitional transmittal of the rope from one arcuate section to the next;
  (c) the friction roller including means for transferring electrical current to the arcuate sections; and
  (d) the arcuate sections including: (i) an electromagnetic field generating coil embeddedly positioned beneath the channel, a longitudinal axis of the coil arranged in parallel relationship with a longitudinal axis of the channel; (ii) means for sensing the proximity of the rope to the channel on a particular arcuate section and for transmitting an electrical current through the coil of the particular arcuate section when the rope is in contact with the particular arcuate section.

2. The roller of claim 1, the electrical transferring means including a brush and slip ring assembly.

3. The roller of claim 1, the sensing and electrical transmitting means including a source of reduced voltage, a pulse generating circuit; and for each particular arcuate section proximity switch means for interrupting electrical current from the source of reduced voltage to the pulse generating circuit when the rope is not positioned to contact the particular arcuate section, silicon control resistor circuit means triggered by the pulse generating circuit for providing electrical current flow to the electromagnetic field generating coil, and a resistance-capacicance circuit means bridging between the electromagnetic field generating coil and one leg of the electrical current.

4. The roller of any one of claims 1-3, the roller being a power driven friction roller.

5. In a frictional drive roller wherein a magnetic flexible element frictionally engages an external surface of the roller while changing direction of motion, a method for enhancing the engagement comprising:
  (a) configuring upon the external surface of the roller a plurality of arcuate sections, the arcuate sections including at least one electromagnetic field generating coil;

(b) sensing rotational positions of the roller at which the element and roller are engaged and
(c) providing a source of electrical current and energizing the coil only while the roller and element are engaged to produce a magnetic field configured to attract the magnetic element to the roller.

6. The method of claim 5, the flexible magnetic element being a rope, and the arcuate sections including a channel configured to receive the rope, the electromagnetic field generating coil being embeddedly positioned within the arcuate section with a longitudinal axis of the coil paralleling a longitudinal axis of the channel and including the step of aligning the channels of the arcuate sections to facilitate a smooth transfer of the rope from arcuate section to adjacent arcuate section.

7. The method of either one of claims 5 and 6, the step of energizing the coil comprising: providing a low voltage electrical current and a pulse generating circuit; providing; a silicon control resistor means configured for triggering via an interconnection to the pulse generating circuit and for controlling electrical interconnection between the coils and line electrical current; and a resistance-capacicance circuit means bridging between the coil and one leg of the line current and establishing a supply of a low voltage electrical current to the pulse generating circuit whereby the silicon control resistors are caused to supply electrical current to the coils.

8. In a friction roller, having an outer, friction surface and an inner surface and including a bearing surface, the roller rotationally frictionally engaging a flexible magnetic element whereby the direction of movement of the element is altered by engagement with the roller, the improvement comprising:
a plurality of arcuate sections positioned upon and surroundingly affixed to the friction roller, the friction roller including means for transferring electrical current to arcuate sections; the arcuate sections including: (i) an electromagnetic field generating coil embeddedly positioned beneath the channel, a longitudinal axis of the coil arranged in parallel relationship with a longitudinal axis of the channel; (ii) means for transmitting the electrical current through the coil together with means for sensing when the flexible element is in contact with the arcuate section and for activating the electrical current transmitting means.

9. The roller of any one of claims 1–3 and 8, the friction roller being one of a pulley, drum, idler, winch drum and conveyor drum and being rotationally driven.

10. The method of claim 5 or 6, the friction roller being one of a pulley, idler, drum, winch drum and conveyor drum and including the steps of rotationally driving the roller.

11. The roller of claim 4, the friction roller being one of a pulley, idler, drum, winch drum and conveyor drum and being rotationally driven.

12. The method of claim 7, the friction roller being one of a pulley, idler, drum, winch drum and conveyor drum and including the steps of rotationally driving the roller.

* * * * *